US011349686B2

(12) United States Patent  
Reber et al.

(10) Patent No.: US 11,349,686 B2
(45) Date of Patent: May 31, 2022

(54) NETWORK ARRANGEMENT AND ADDRESSING OF NETWORK COMPONENTS FOR A CHARGING PARK

(71) Applicant: Dr. Ing. h.c. F. Porsche Aktiengesellschaft, Stuttgart (DE)

(72) Inventors: Volker Reber, Michelbach/Bilz (DE); Iosif-Norbert Gaier, Oberriexingen (DE); Eric Vogel, Stuttgart (DE); Steve Zander, Marbach am Neckar (DE); Julian Kramer, Stuttgart (DE); Timo Kaul, Bietigheim-Bissingen (DE); Christian Metzger, Tamm (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 73 days.

(21) Appl. No.: 16/985,451

(22) Filed: Aug. 5, 2020

(65) Prior Publication Data  
US 2021/0044452 A1 Feb. 11, 2021

(30) Foreign Application Priority Data  
Aug. 5, 2019 (DE) .................... 10 2019 121 085.2

(51) Int. Cl.  
*H04L 12/44* (2006.01)  
*H04L 12/66* (2006.01)  
*H04L 49/552* (2022.01)  
*H04L 49/40* (2022.01)  
*H04L 49/60* (2022.01)  
(Continued)

(52) U.S. Cl.  
CPC .............. *H04L 12/44* (2013.01); *B60L 53/30* (2019.02); *B60L 53/68* (2019.02); *G06F 21/64* (2013.01);  
(Continued)

(58) Field of Classification Search  
CPC ....... H04L 12/44; H04L 12/66; H04L 41/082; H04L 49/40; H04L 49/552; H04L 49/604;  
(Continued)

(56) References Cited

U.S. PATENT DOCUMENTS

| 2009/0273310 | A1* | 11/2009 | Flack | B60L 53/302 320/107 |
| 2014/0204954 | A1* | 7/2014 | Nee | H04L 45/302 370/401 |

(Continued)

FOREIGN PATENT DOCUMENTS

| EP | 0 769 217 | 10/2001 |
| EP | 1 065 858 | 12/2005 |
| EP | 2 783 484 | 3/2016 |

*Primary Examiner* — Walli Z Butt  
*Assistant Examiner* — Shawn D Miller  
(74) *Attorney, Agent, or Firm* — Gerald E. Hespos; Michael J. Porco; Matthew T. Hespos

(57) ABSTRACT

A network arrangement is provided for a charging park for providing IP services to the charging park. The charging park has a plurality of components. The network arrangement comprises a core network, a backend server and a central gateway that is coupled to the core network and to the backend server. The central gateway provides an interface for one or more communication nodes of the core network. The components of the charging park are connected communicatively to one another and to the central gateway via the core network. Each component of the charging park has an associated communication node of the core network, and the components of the charging park can interchange data with the backend server via the central gateway via their respective associated communication nodes and the interfaces associated with the communication nodes. Further, the invention relates to a method for addressing components of the charging park.

14 Claims, 7 Drawing Sheets

(51) Int. Cl.
    *H04L 41/082*     (2022.01)
    *H04L 67/00*     (2022.01)
    *G06F 21/64*     (2013.01)
    *B60L 53/68*     (2019.01)
    *B60L 53/30*     (2019.01)
    *H04L 67/10*     (2022.01)

(52) U.S. Cl.
    CPC ............ *H04L 12/66* (2013.01); *H04L 41/082* (2013.01); *H04L 49/40* (2013.01); *H04L 49/552* (2013.01); *H04L 49/604* (2013.01); *H04L 67/10* (2013.01); *H04L 67/34* (2013.01); *H04L 2012/445* (2013.01)

(58) Field of Classification Search
    CPC ... H04L 67/10; H04L 67/34; H04L 2012/445; H04L 67/12; H04L 12/4625; H04L 61/2007; H04L 61/6022; H04L 61/6059; H04L 69/16; B60L 53/30; B60L 53/68; B60L 53/302; B60L 53/31; B60L 53/66; B60L 53/67; G06F 21/64; Y04S 30/12; Y04S 30/14; Y02T 10/70; Y02T 10/7072; Y02T 90/12; Y02T 90/16; Y02T 90/167
    See application file for complete search history.

(56) References Cited

U.S. PATENT DOCUMENTS

| | | | |
|---|---|---|---|
| 2014/0258457 A1* | 9/2014 | Han | G07F 15/008 709/217 |
| 2015/0006701 A1 | 1/2015 | Armbruster et al. | |

\* cited by examiner

NETWORK ARRANGEMENT AND ADDRESSING OF NETWORK COMPONENTS FOR A CHARGING PARK

CROSS REFERENCE TO RELATED APPLICATION

This application claims priority under 35 USC 119 to German Patent Appl. No. 10 2019 121 085.2 filed on Aug. 5, 2019, the entire disclosure of which is incorporated herein by reference.

BACKGROUND

Field of the Invention

The invention relates to a network arrangement for a charging park in which at least one electric vehicle can be charged and to a communication or software architecture of the network arrangement. The invention also relates to a method for addressing network components for the charging park.

Related Art

Charging stations provide the opportunity to charge at least one traction battery of an electric vehicle in a manner comparable to a conventional filling station for automobiles with internal combustion engines. For the most part, connection of the respective charging station to a medium-voltage grid of an energy supplier provides a charging current that is supplied to an electric vehicle parked at the charging station. If there are multiple charging stations at such a connection, and/or if multiple electric vehicles are being charged at these charging stations at the same time, the need arises to distribute a finite power capacity of the connection to the medium-voltage grid as effectively as possible. It may also be necessary to consider a state of charge of the traction battery of the respective electric vehicle. Thus there is a need to exchange information originating at different points in a system formed from the charging stations and the electric vehicles to be charged, and this information needs to have communication means provided for it.

EP 0 769 217 B1 discloses a charging station along with a distribution grid. EP 0 769 217 B1 also discloses a method for charging the battery of the electric vehicle that supplies charging energy irrespective of the presence or the type of a charge control unit in the electric vehicle.

EP 2 783 484 B1 describes a method for operating a communication network. The method is directed to prioritizing a data interchange between at least one first transmitting and receiving port over a data interchange between other transmitting and receiving ports in the communication network.

EP 1 065 858 B1 discloses a network arrangement for delivering IP services to subscriber terminals. A respective transmission process takes place in a tunnel that has been produced in the network. The network has a multiplicity of such tunnels.

Against this background, it is an object of the invention to provide a network arrangement for a communication exchange that occurs during a charging process for a traction battery at one or more charging stations. In particular, there is a need to provide a structure and communication means to operate multiple charging stations at one connection to a supply grid. A method also is provided that can be used for a given network arrangement to address individual components of the network uniquely, to actuate the components and to associate them with one another.

SUMMARY

One aspect of the invention relates to a network arrangement for a charging park for providing IP services to the charging park. The charging park comprises a plurality of components. The network arrangement comprises a core network, a backend server and a central gateway that is coupled to the core network and to the backend server. The central gateway provides an interface for one or more communication nodes of the core network. A backend server is understood to mean any server that processes and/or provides data. The components of the charging park are connected communicatively to one another and to the central gateway via the core network. Each component of the charging park has an associated communication node of the core network. The respective components of the charging park can interchange data/signals with the backend server via the central gateway via their respective associated communication nodes and the respective interface associated with the communication nodes.

The central gateway is configured to coordinate a data transfer within the core network. A transmission of data within the core network advantageously takes place according to IPv6, abbreviated for Internet Protocol Version 6.

The central gateway can be coupled to the backend server by radio technology, in particular mobile radio, by means of DSL, Ethernet, WLAN and/or a combination of these. The radio technology can be formed for example by GSM, UMTS, LTE or a more sophisticated mobile radio standard.

The backend server can be located/implemented in a cloud and, in the cloud, has a secure cloud memory location that is permanently parameterized for the central gateway. A transmission of data between the backend server and the central gateway advantageously takes place according to IPv4, abbreviated for Internet Protocol Version 4. Data to be transmitted between the central gateway and the backend server are divided into at least four channels and accordingly transmitted via the at least four channels. A first channel is formed by state data that relate to at least one state of at least one application program, also referred to as an application, that is executed on at least one control unit in the core network. State data can also come from at least one control unit or sensor outside the core network, however. A second channel is formed by billing data that relate to a charging current transmitted to a traction battery of a respective electric vehicle. A third channel is formed by diagnosis data that are formed by at least one control unit or sensor. A fourth channel is formed by adaptations or reloads of application programs or of system programs executed on individual components of the charging park, also referred to as an update or firmware update. The first channel is executed in a transport layer, also referred to as the fourth layer of an OSI model, using UDP/IP, i.e. transmission of the data involves no so-called handshake being performed or for example an acknowledgement being awaited. Channels two to four are executed using TCP/IP. A common feature of all of these is the use of Ethernet MAC IEEE 802.3 in a data link layer of the OSI model.

The central gateway, which a control server comprises, executes a cyclic-deterministic communication in the two-digit seconds range. This allows communication monitoring, for example in respect of a timeout, to be performed. The Ethernet definitions adapted to the charging park permit coordination of timing between multiple units/components within the charging park and also access monitoring.

In a refinement of the network arrangement according to the invention, the central gateway has at least one module executing gateway-specific tasks. Gateway-specific tasks is essentially intended to be understood to mean connection setup between two components of the charging park or between a component of the charging park and the backend server, but also functions related thereto, that is to say for example addressing of the respective components. This module can be of redundant design, i.e. the module is arranged in a full scope of functions of a central gateway at least twice.

In a further refinement of the network arrangement according to the invention, the core network is an Ethernet-based network in which the communication nodes are connected to the central gateway via respective fiber-optic lines and/or copper lines and/or interfaces and to one another directly and/or to one another indirectly via the central gateway. A data interchange takes place using a communication protocol based on UDP, abbreviated for User Data Protocol, or TCP, abbreviated for Transmission Control Protocol. A so-called "Automotive Ethernet" known from the prior art is therefore implemented in the network arrangement according to the invention in a refinement or embodiment tailored to a charging park. However, fiber-optic cables, if necessary alternatively or in combination with copper lines, are used on account of the greater distances in the charging park.

In yet another refinement of the network arrangement according to the invention, the charging park comprises at least the central gateway, at least one cooling module, at least one power electronics module, at least one charge control unit and at least one charging cable plug as components.

In a continuing further refinement of the network arrangement according to the invention, the components of the charging park are assigned to respective dedicated housings, wherein the central gateway is implemented in a control server within a transformer station and the control server additionally has a system router, an independent power supply, at least one interface for actuating at least one control unit or sensor that is not involved in the core network and a central switch having a series of Ethernet ports, wherein the at least one cooling module is implemented in a cooling box or a combo box and the cooling box or the combo box has an Ethernet port for each cooling module, wherein the at least one power electronics module is implemented in at least one power box or else in the combo box and the power box or the combo box additionally has a switch having a series of Ethernet ports, wherein the at least one charge control unit and the at least one charging cable plug are implemented in at least one distribution unit of at least one distribution group. Whereas the cooling box has just at least one cooling module and the power box has at least one power electronics module, the combo box comprises both at least one cooling module and at least one power electronics module.

An exemplary charging park having the network arrangement according to the invention provides a respective charging post for a prescribed number of between one and twelve electric vehicles. In general, although such an arrangement is scalable, a number of six charging posts or charging points is particularly advantageous. The limiting element is a medium-voltage transformer: upward of a size of approximately eight charging posts, a design of the transformer becomes very complex. A respective charging post provides a charging cable cooled by the accompanying cooling box, to which up to six charging posts can be connected, for example, with a charging cable plug situated at one end of the charging cable being inserted into a charging socket of an electric vehicle parked in front of the respective charging post. The transformer station, which can have a connection to a medium-voltage grid, for example, of an energy supplier, provides a charging current that is delivered to the respective charging posts via decentralized power boxes, which respectively comprise two power electronics units, i.e. one each per charging point supplied to. Both the power electronics units situated in the power boxes and the charging cable carrying the charging current in the post are cooled, the cooling power for this purpose being applied in the at least one cooling module of the cooling box.

In a further refinement of the network arrangement according to the invention, the IP services provided to the charging park, in particular to the components that the charging park comprises, comprise at least one service selected from data transfer, remote computing, database access.

In yet another refinement of the network arrangement according to the invention, the core network has a tree topology having a root, a plurality of branches, each having at least one communication node, and at least one leaf, wherein the central gateway is the root and the respective components of the charging park are associated with a respective communication node or leaf.

In a continuing further refinement of the network arrangement according to the invention, charge controllers that the plurality of components comprise are each associated with a leaf and power electronics units that the plurality of components comprise are each associated with a communication node.

In a further refinement of the network arrangement according to the invention, the network arrangement is configured to perform a data transfer within the core network without or with the involvement of the gateway, but without the involvement of the backend server. This means that at least three communication scenarios are conceivable. In a first communication scenario, local communication takes place by Ethernet among the respective components of the charging park, specifically without the backend server being involved. In a second communication scenario, the central gateway provides a single contact with the backend and is additionally available for local communication within the charging park. In a third communication scenario, specific aspects involve individual components of the charging park communicating without the involvement of the central gateway, for example during emergency operation in which the central gateway has failed but the distribution units continue to run within the most recently transmitted parameters and inform one another about the amount of charging current being drawn at present.

Some aspects of a charging park, such as for example heat management, lighting management or load management, are also possible when the backend server fails or is not available. The communication in this regard takes place via the central gateway, and for example energy and/or load balancing is possible within predetermined parameters or parameters stipulated when the backend server was last accessed. Although the power boxes within the charging park are connected to the central gateway physically, i.e. without radio technology, this being achieved by means of fiber-optic lines, for example, the power boxes can also be connected to one another by fiber-optic or copper lines.

Further, a method for addressing components of the charging park is claimed, in order to perform a data interchange via a core network that a network arrangement according to the invention comprises. Every single component of the charging park is assigned a unique network address by forming a global identification number. The global identification number is formed from a series of values referring to the charging park, wherein a first value refers to a group of components, a second value refers to a type of the components, a third value refers to a control unit number or a group number, and a fourth value refers to a respective distribution group. This task, i.e. the formation and assignment of the respective global identification number, is carried out by the central gateway.

In addition, every component in the charging park is coupled to its respective IPv6 address by means of its respective MAC address. An association between MAC address and IPv6 address is communicated to the backend server by the central gateway when the network arrangement of the charging park is initialized. By contrast, the global identification number is formed in the central gateway, depending on which components or groups of components are supposed to be addressed. Using this global identification number, it is explicitly possible for a dedicated component or group to be addressed via the central gateway, however.

The central gateway provides the only data-transmission access to the charging park, which is in contrast to charging posts from the prior art that each have separate access to the Internet. However, access to the core network also is possible locally using one of the switches that are located in the core network, for example in order to perform configurations. The central access to the charging park via the central gateway advantageously increases an IT security of the charging park. The central gateway usually is connected to the Internet by radio, with DSL modem or similar techniques also being possible. All data from the control units, such as for example charging current data or heat data, are saved within a UDP frame separately by means of respective checksums at application level, so that data transmission errors are detectable. These data are transmitted cyclically and deterministically, in contrast to an event-based transmission. This advantageously allows the detection of a timeout, i.e. the exceeding of a period of time stipulated for a data transmission process. By adding deterministic timing functions, the range of applications for the Ethernet in the charging park is broadened.

In one embodiment of the method of the invention, communication within the core network is executed in line with an Open System Interconnection layer model, abbreviated as OSI layer model. Monitoring of the communication, i.e. whether a data interchange is erroneous, is made possible by cyclic conveyance of information using end-to-end protection by means of checksum formation. This also advantageously makes immediate detection of a communication failure possible with appropriate fallback reactions.

The communication with or in a control unit is defined by a data stipulation. For the purpose of communication exchange via a CAN bus, the data stipulation is made in a dbc file readable in plain text. This is used for developing and monitoring the transmitted data. The CAN bus is used in the power electronics unit internally and in regard to communication for the Chinese GB/T standard, but not for the fundamental charging park communication. This means that, directly or indirectly, a communication structure is also stipulated for the individual control units in the charging park, and the monitoring of the communication is made possible by end-to-end protection, for example by means of a checksum conveyed in a data packet. This involves the use of ARXML software standardized in the automotive sector.

In a continuing further embodiment of the method, the monitoring of the communication is extended to an electric vehicle intermittently coupled to the charging park. The electric vehicle is coupled by the charging cable plug.

In a further embodiment of the method, at least two components of the charging park are grouped to form a group and the respective group is assigned a unique network address. Advantageously, the control units called upon during a charging process at a respective distribution unit, such as for example the respective power electronics unit and the respective charge controller, can be addressed jointly.

In yet another embodiment of the method, a flash process, also called "flashing" for short, performs reprogramming of at least one component of the charging park. The control units/components are reprogrammed via the central gateway, which coordinates the flashing. This allows targeted gradual flashing of the individual control units in the charging park. The software required for this purpose is downloaded from the backend to the central gateway only once and distributed to, or "loaded" onto, the individual control units/components within the charging park by the central gateway in coordinated fashion. This allows the flashing to be coordinated in tune with the present operation of the charging park, so that the charging park can continue to be operated without lengthy interruption. Separate targeted flashing of individual components within the charging park was not possible in the prior art to date, since the flashing was performed directly via the backend, and not every single component was networked to the backend via a central gateway. The flash process can put new parameterization into effect for the entire charging park, for example, as described in FIG. 8 in exemplary fashion below. Other advantages and refinements of the invention will emerge from the description and the accompanying drawings.

The features cited above and those yet to be illustrated below are usable not only in the respectively indicated combination but also in other combinations or on their own without departing from the scope of the present invention.

DETAILED DESCRIPTION

Figure 1:
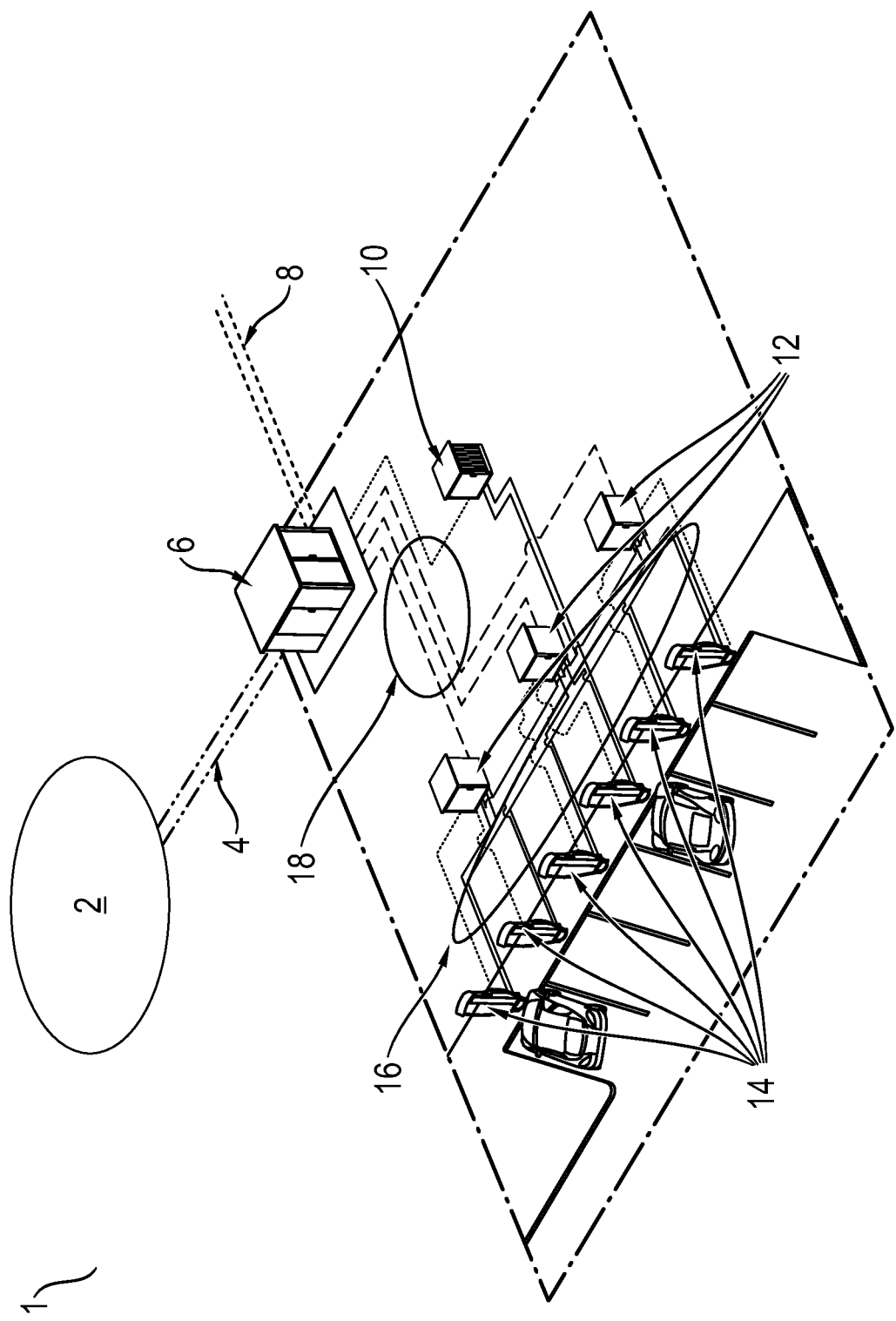
FIG. 1 is a schematic overview of a charging park according to a refinement of the network arrangement according to the invention.

FIG. 1 shows a schematic overview of a charging park 1 according to a refinement of a network arrangement according to the invention. A central gateway is located in a transformer station 6 and is connected therefrom to a backend server 2 via a data connection. The transformer station 6 is connected to a supply grid, for example of an energy supplier, by electrical lines 8. When described as a tree topology, branches 18 are formed starting from the central gateway, corresponding to a root, in the transformer station 6 to the components power box 12, three of which are present in exemplary fashion in this instance, and cooling box 10. Each power box 12 has two respective associated distribution units (dispenser units) 14, as leaves, with a respective charging cable. Additionally, there are branches from the cooling box 10 to the heat-generating power boxes 12 and to the distribution units 14 with the charging cables to be cooled.

Figure 2:
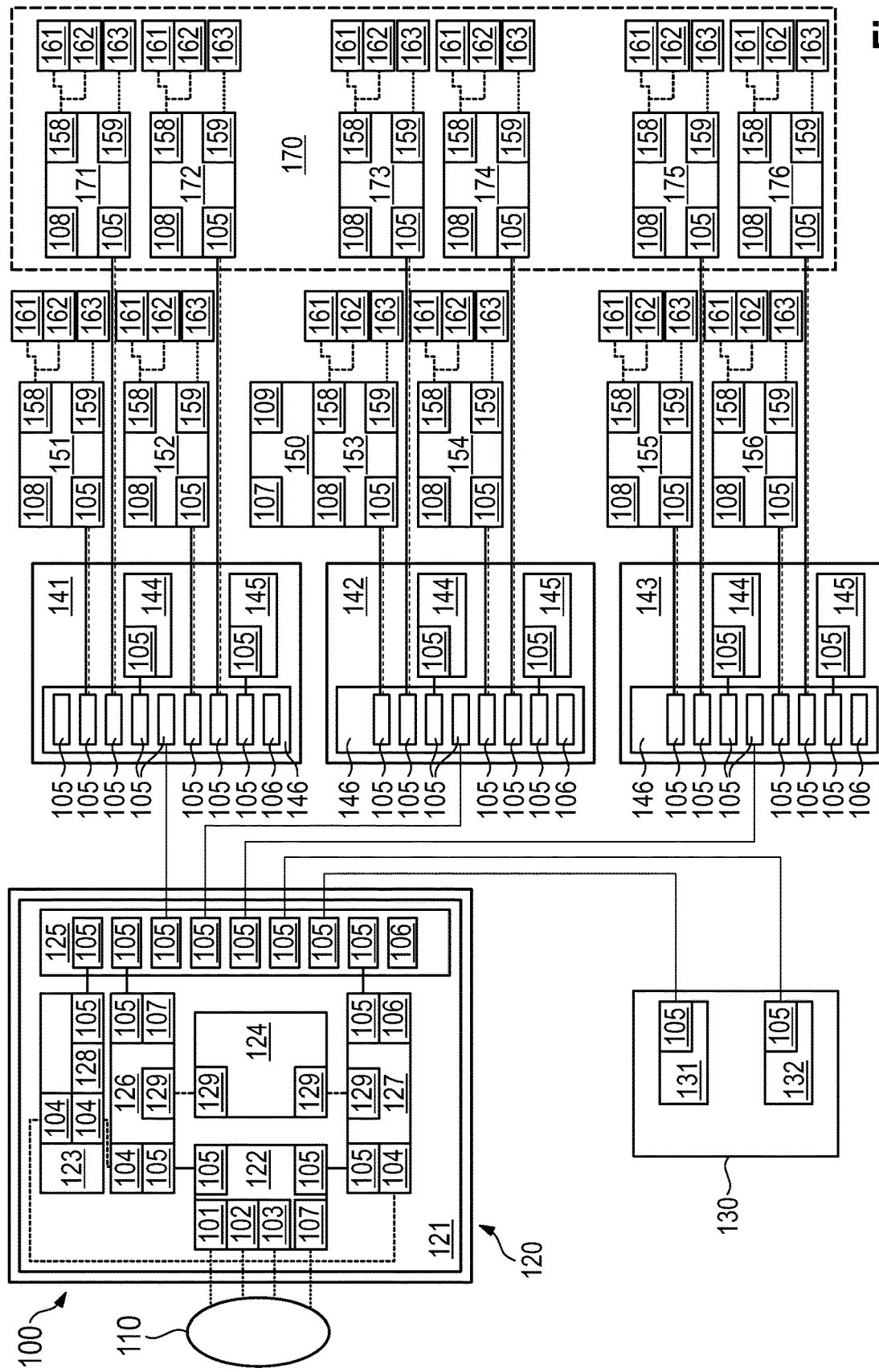
FIG. 2 schematically shows a refinement of the network arrangement according to the invention for a charging park.

FIG. 2 schematically shows a refinement of a network arrangement 100 according to the invention for a charging park. The backend server 110 of a central system is connected to a respective port 101, 102, 103 and 107 of a system router 122 via various wired or radio data transmission paths. A charging park management server (LMS) or a central gateway, which is of redundant design in exemplary fashion in this instance, 126 and 127 opens a web socket for each charging post. The backend server 110 therefore effectively sees a collection of individual charging points for Open Charge Point protocol communication. The port examples shown in this case are a DSL port 101, a fiber-optic port 102, a cable port 103 and an LTE mobile radio port 107. The system router 122 is part of a control server 121 located in the transformer station 120. An uninterruptible power supply, UPS for short, 123, an interface 124 for control units or sensors outside a core network (with which all other components depicted in FIG. 2 are associated), a central gateway, which is of redundant design in exemplary fashion in this instance, 126 and 127 and a central switch 125 are likewise parts of the control server 121. The system router 122 is connected to the central gateway 126 and 127 of redundant design via a respective Ethernet port 105. The UPS 123 can be connected to the central gateway via an IIO port, but in the example shown here is likewise connected to the central gateway 126 and 127 of redundant design via a respective USB port 104, and in this case has an optional XOR gate 128. Additionally, the UPS 123 is optionally connected to the central switch 125 via the Ethernet port 105. The central switch 125 is a communication node of the core network. The interface 124 for control units or sensors outside the core network is connected to the central gateway 126 and 127 of redundant design via a respective RS-232 port. Finally, the central gateway 126 and 127 of redundant design is connected to the central switch 125 via a respective Ethernet port 105. Starting from the central switch 125, a series of Ethernet ports 105 provide a respective connection to the three power boxes 141, 142 and 143 shown here in exemplary fashion, and to the cooling box 130. Additionally, the central switch 125 provides a service Ethernet port 106. The cooling box 130 has two cooling modules 131 and 132, which each have an Ethernet port 105. The three power boxes 141, 142 and 143 are of identical design. A respective power box 141, 142 or 143 comprises two power electronics modules 144 and 145 and a switch 146 having a series of Ethernet ports 105 and an additional service Ethernet port 106. The power boxes 141, 142 and 143, specifically the respective switches 146 they comprise within the respective power boxes 141, 142, 143, are a respective communication node of the core network in this instance. Similarly, the cooling box 130 is a communication node of the core network. The power electronics modules 144 and 145 are respectively connected to the switch 146 via an Ethernet port 105. The respective power boxes 141, 142 and 143 are connected to two respective charge controllers 151 and 152 or 153 and 154 or 155 and 156 by Ethernet via a respective fiber-optic or alternatively copper line, represented as a solid or alternatively dashed line. Specifically, the power box 141 is connected to the charge controllers 151 and 152, the power box 142 is connected to the charge controllers 153 and 154, and the power box 143 is connected to the charge controllers 155 and 156. The respective charge controllers 151, 152, 153, 154, 155 and 156 of a distribution group are of identical design. A respective charge controller 151, 152, 153, 154, 155 or 156 comprises an Ethernet port 105, via which it is connected to the respective power box 141, 142 or 143 and, via the latter, is associated with the respective switch 146 as a communication node of the core network. Said charge controller further comprises a near field communication port, NFC port for short, 108, a controller area network port, CAN port for short, 158 and a PLC port 159 for power line communication. The NFC port 108 is available for billing based on the RFID standard. Configuration of the CAN port 158 and of the PLC port 159 is performed on the basis of the implemented charging standard: the Japanese CHAdeMO 161 or the Chinese GB/T 162 are associated with the CAN port 158, while a European or American version of the Combined Charging System 163, CCS1 or CCS2, is associated with the PLC port 159. An optional customer router 150 is based on the charge controller 153, but can also be based on any other charge controller 151, 152, 154, 155 or 156. The customer router 150 has an LTE mobile radio port 107 and a WLAN port 109. Optionally, there may also be a second distribution group 170 of charge controllers 171, 172, 173, 174, 175 and 176, which are connected to the respective power boxes 141, 142 or 143 in the same way as the charge controllers 151, 152, 153, 154, 155 and 156 and provide the same ports 161, 162, 163 for charging standards.

Figure 3:
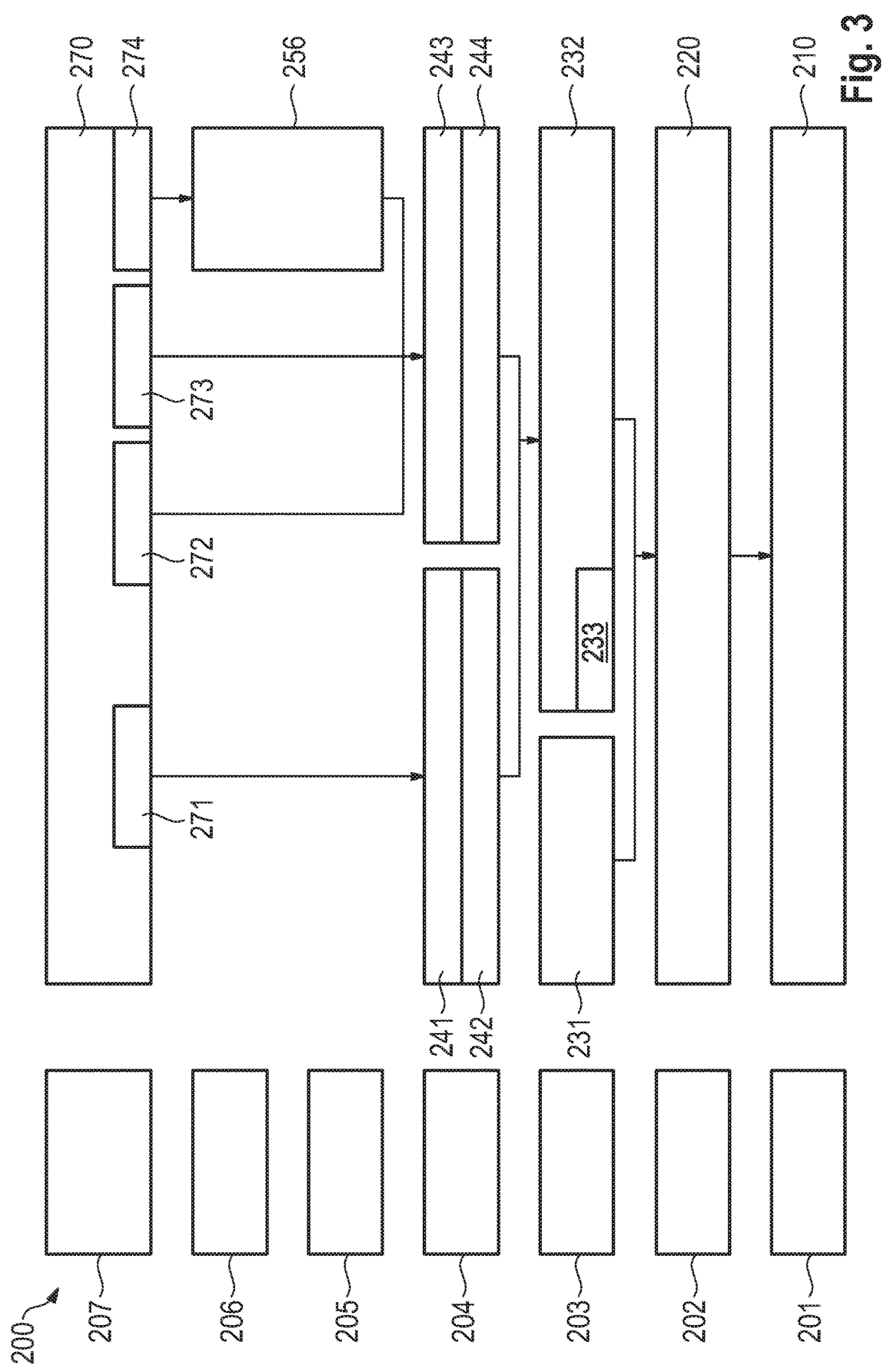
FIG. 3 schematically shows a communication layer model used in a refinement of the network arrangement according to the invention according to an embodiment of the method according to the invention.

FIG. 3 schematically shows a communication layer model 200 used in a refinement of a network arrangement according to the invention according to an embodiment of a method according to the invention. Said communication layer model is based on the Open Systems Interconnection model, OSI model for short, which is a reference model for network protocols as a layer architecture and consists of seven layers. The first layer 201 is formed by a physical layer 210, which comprises the data transmission in copper or fiber-optic lines. The second layer 202 is formed by a link layer 220, which performs Ethernet Media Access Control based on IEEE standard 802.3. The third layer 203 forms a network layer, which uses firstly an optional Network Time Protocol, NTP for short, 231, and secondly Internet Protocol version 6, IPv6 for short, 232, or Internet Control Message Protocol version 6, ICMPv6 for short, 233. In some cases, however, it is also possible for Internet Protocol version 4, IPv4 for short, to be used. The fourth layer 204 forms a transport layer with the protocols Datagram Transport Layer Security, DTLS for short, 241 with User Datagram Protocol, UDP for short, 242 on the one hand and with Transport Layer Security, TLS for short, 243 with Transmission Control Protocol, TCP for short, 244 on the other hand. The fifth layer 205 is formed by a session layer, which controls process communication between two systems in the OSI model, and the sixth layer 206 is formed by a presentation layer, which converts a system-dependent presentation of data into a system-independent form in the OSI model. Both layers 205 and 206 are formed, as far as the data transmission from a diagnosis 274 is concerned, by means of Cellular Digital Packet Data, CDPD for short, 256. The other data transmission from the seventh layer 207, which forms a so-called application layer 270, takes place directly by means of the security protocols DTSL 241 and TLS 243 of the fourth layer, however, and is formed by applications 271, protocol buffers 272 and SFTP 273.

Figure 4:
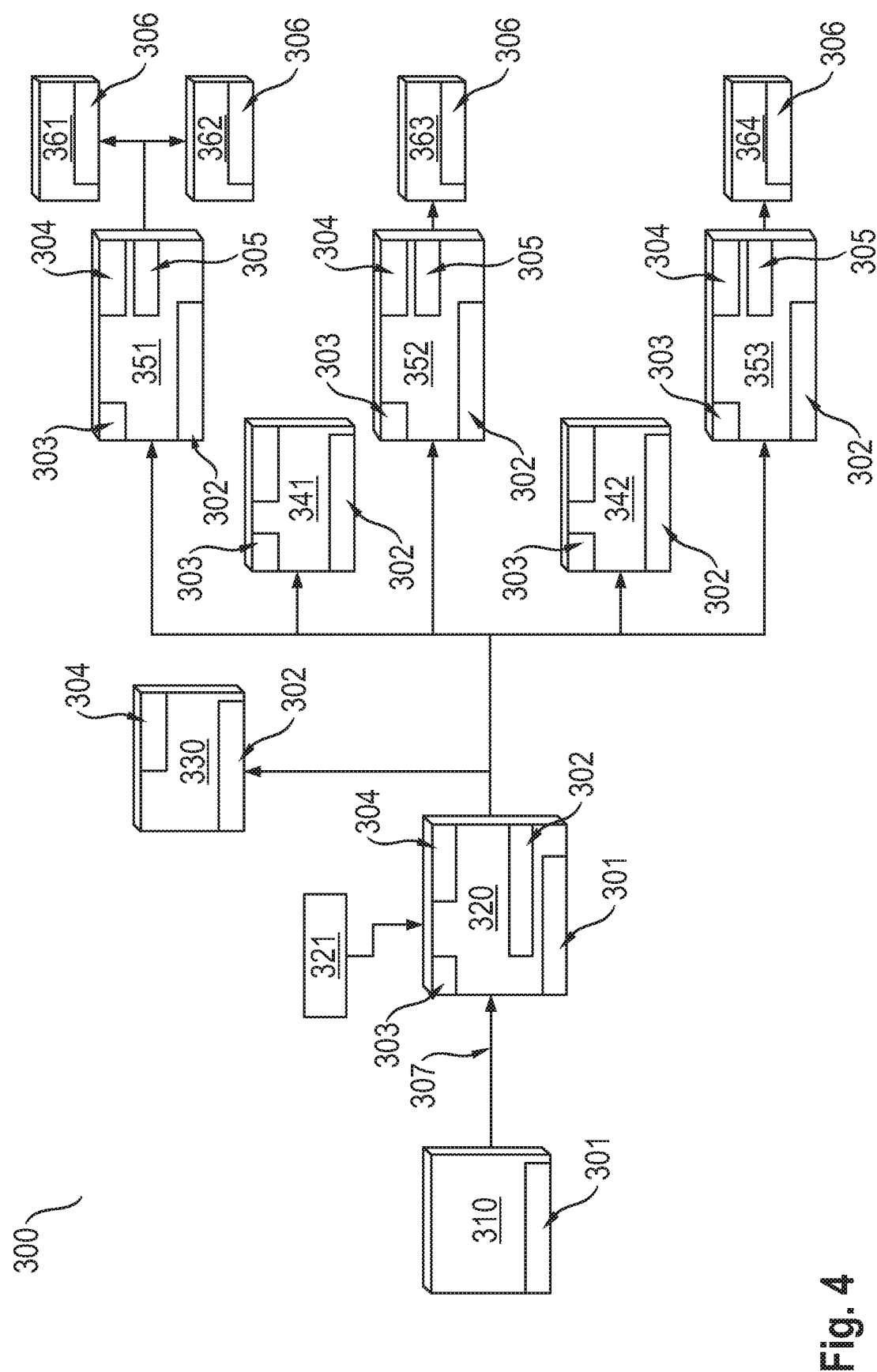
FIG. 4 schematically shows an architecture of the network that is obtained by virtue of a refinement of the network arrangement according the invention, with addressing options obtained according to an embodiment of the method according to the invention.

FIG. 4 schematically shows an architecture 300 of the network that is obtained by virtue of a refinement of a network arrangement according the invention, with addressing options obtained by an embodiment of a method according to the invention. A backend module or backend server 310 has an IP address according to IPv4 and can exchange objects with the central gateway 320 according to JavaScript Object Notation, JSON for short, 307. The central gateway 320 forms a CP null communication node 303 and has a global ID 304. It uses its IP address 301 according to IPv4 to communicate with the backend server 310. For the communication in the core network, it has an IP address according to IPv6. The central gateway 320 has an association table 321 between global IDs 304 and IP addresses 302 available. The cooling module 330 has an assigned global ID 304 and communicates as a communication node in the core network using its IP address 302. In the depicted refinement of a network arrangement according to the invention, a power electronics module 341 and two charge controllers 351 and 352 form a group "charging point CP-1" and are associated with a CP-1 communication node 303. A power electronics module 342 and a charge controller 353 form a group "charging point CP-2" and are associated with a CP-2 communication node 303, CP-2 being a variant realization of CP-1. Each of these components 341, 342, 351, 352 and 353 has a global ID 304 of its own. The respective charge controllers 351, 352 and 353 additionally have a charging station identification number EVSE-ID 305 and are connected to at least one distribution unit 361, 362, 363 or 364. In the depicted refinement of a network arrangement according to the invention, the charge controller 351 is connected to the distribution units 361 and 362, the charge controller 352 is connected to the distribution unit 363 and the charge controller 353 is connected to the distribution unit 364. The distribution units 361, 362, 363 and 364 have a respective connection ID 306.

Figure 5:
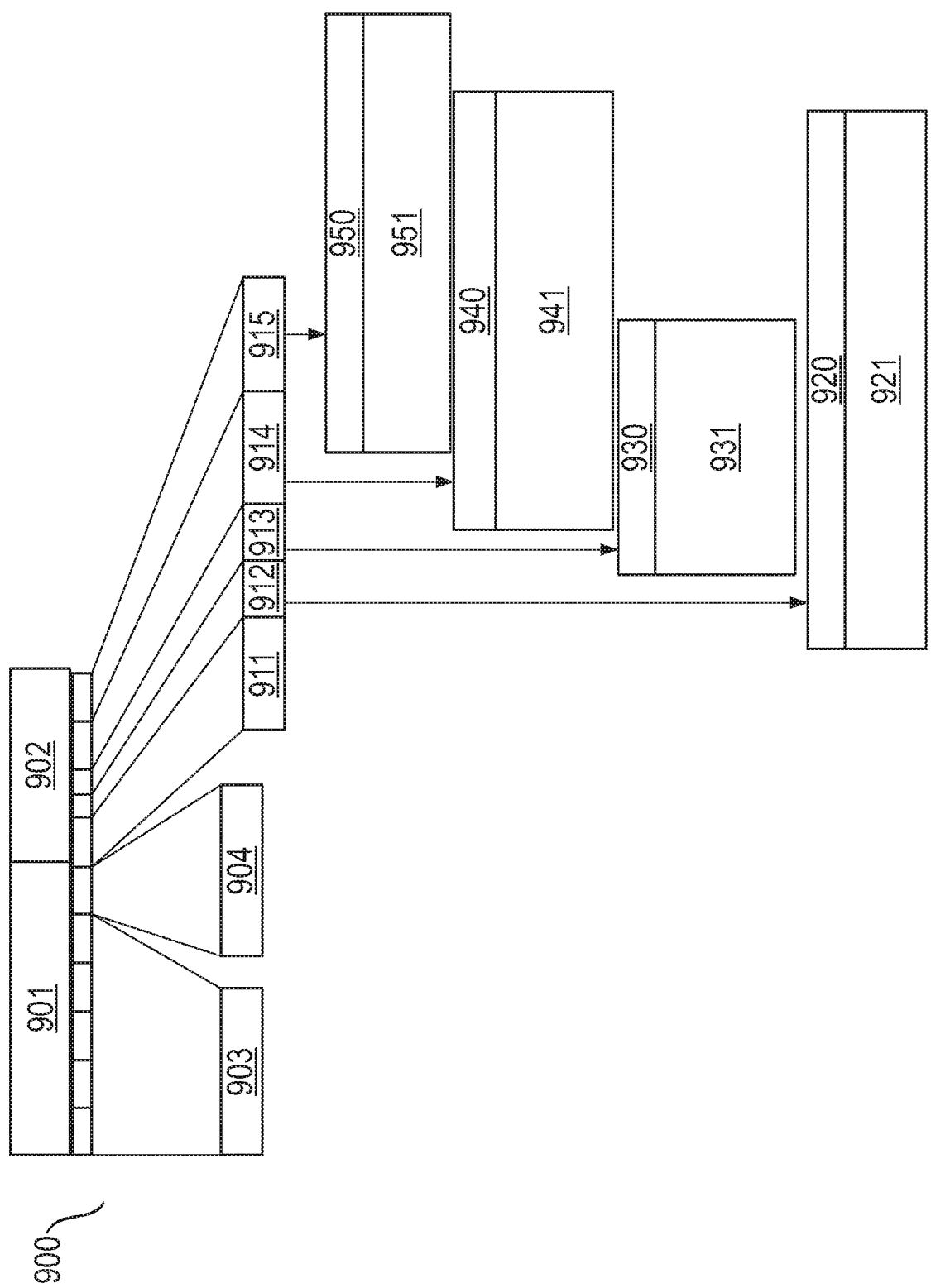
FIG. 5 schematically shows a definition of a global ID for an addressing according to an embodiment of the method according to the invention.

FIG. 5 schematically shows a definition of a global ID for an addressing 900 according to an embodiment of a method according to the invention. The global ID has a first portion cited as "park prefix" 901 and a second portion cited as "ECU-ID" 902. The park prefix 901 comprises six bytes, of which a group 903 of the first five bytes is for unregulated use and a sixth byte 904 is a site number assigned to the central gateway. The ECU-ID 902, that is to say a control unit identification number, comprises four bytes, of which a first byte 911 is reserved for future use and a second byte uses the first four bits 912 to reference a group of components of the charging park and uses the second four bits 913 to reference a type of components of the charging park. A third byte 914 is a simple number, while a fourth byte 915 forms an index. The first four bits 912 of the second byte of the ECU-ID 902 assume the following values 920, which are assigned to the described cases 921: they assume a value 0 if no group, no control unit or no control unit type is referenced. They assume the value 1 if a cooling group is referenced, and they assume the value 2 if a charging point group is referenced. All other values are reserved for future use. The second four bits 913, which denote a type of components of the charging park, assume the following values 930, which are assigned to the described cases 931: they assume the value 1 if the central gateway is referenced, they assume the value 2 if a power electronics module is referenced, they assume the value 3 if a charge controller is referenced, they assume the value 4 if a cooling module is referenced, they assume the value 5 if a power box or a charge box is referenced, they assume the hexadecimal value F if all components together are referenced. Values other than those cited are reserved for future use. The third byte 914 assumes the following values 940, which are assigned to the described cases 941: the value 940 corresponds to a control unit number if the individual control unit is referenced. The value 940 corresponds to a group number if a group is referenced. Finally, the value 940 assumes the hexadecimal value FF if all control units are referenced. The fourth byte 915 assumes the following values 950, which are assigned to the described cases 951, described in exemplary fashion in this instance, if the value 930 corresponds to that for the charge controller: the hexadecimal value A is assumed for charge controllers from a distribution group A, denoted by LKxxA (x is a number in this instance). The hexadecimal value B is assumed for charge controllers from a distribution group B, denoted by LKxxB. The hexadecimal value F is assumed if an index number is not needed or both aforementioned charging groups LKxxA and LKxxB are referenced. A first example, how an ECU-ID 902 is obtained, is depicted for the case in which an individual control unit, for example the first power electronics module in the core network, is referenced: since a group is not involved, the value 920 is equal to zero. For the power electronics module type, the value 930 is assigned a two. The third byte 914 is assigned a one, since the first power electronics module has the control unit number one. There is only supposed to be one distribution group in the example, which means that an index is not needed and the value 950 is assigned an F. Therefore, "0002010F" is obtained as ECU-ID. A second example is depicted for the case in which all control units of the charge controller type are referenced: since a group is not involved, the value 920 is equal to zero. For the charge controller type, the value 930 is assigned a three. The third byte 914 is assigned an FF, since all control unit numbers of charge controller type are supposed to be referenced. There is only supposed to be one distribution group in the example, which means that an index is not needed and the value 950 is assigned an F. Therefore, "0003FF0F" is obtained as ECU-ID. A third example is depicted for the case in which all charge controllers of a charging group are referenced: since a charging point group is involved, the value 920 is assigned a two. For the charge controller type, the value 930 is assigned a three. The third byte 914 is assigned a one, since a first group of charge controllers is involved. There is only supposed to be one distribution group in the example, which means that an index is not needed and the value 950 is assigned an F. Therefore, "0023010F" is obtained as ECU-ID. A fourth example is depicted for the case in which all control units of the cooling group 1 are referenced: since a cooling group is involved, the value 920 is assigned a one. Since the type is supposed to involve all control units of the cooling group being referenced, the value 930 is assigned an F. The third byte 914 is assigned a one, since a first cooling group is involved. There is only supposed to be one distribution group in the example, which means that an index is not needed and the value 950 is assigned an F. Therefore, "001F010F" is obtained as ECU-ID. A fifth example is depicted for the case in which all control units of the charging park are referenced: since a specific group is not referenced, the value 920 is assigned a zero. Since the type is supposed to involve all control units being referenced, the value 930 is assigned an F. The third byte 914 is assigned an FF, since all control units are referenced. There is only supposed to be one distribution group in the example, which means that an index is not needed and the value 950 is assigned an F. Therefore, "000FFF0F" is obtained as ECU-ID.

Figure 6:
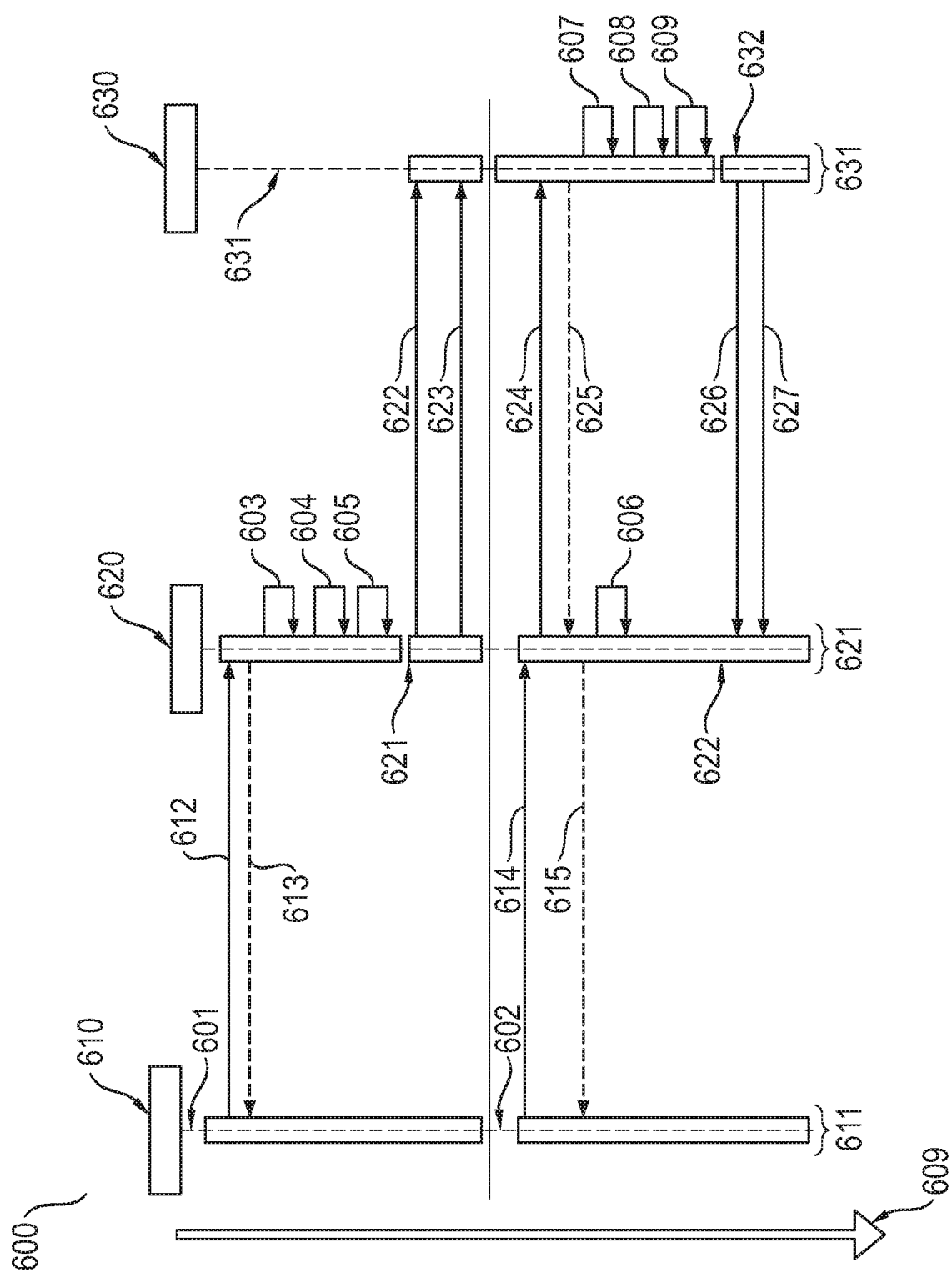
FIG. 6 schematically shows a flow diagram for a grouping according to an embodiment of the method according to the invention.

FIG. 6 schematically shows a flow diagram 600 for a grouping according to an embodiment of a method according to the invention. A communication exchange between individual components of the charging park and work steps of the components are depicted on the basis of the flow diagram 600, with a timing arrow 609 indicating an order. The components are an HTML tester 610, the central gateway 620 and the charge controller 630, an activity of the respective component being depicted by means of a respectively widened strip 611, 621 and 631. The HTML tester 610 component is executed on the central gateway 620 or charging management system (LMS) 620. First, a "group central gateway" process 601 is shown: a "group" command 612 with accompanying grouping parameters is output from the HTML tester 610 to the central gateway 620. If a component or a control unit, in this case the central gateway 620, notices that the grouping parameters match and the grouping can be implemented immediately, this is acknowledged with a positive response 613. Next, the central gateway 620 performs an IPv6 address configuration 603, then a send and receive configuration for a protocol data unit identification 604, and finally performs a reset 605. The communication 621 then needs to be reopened to reconfigure the IPv6 address, and application data 622 and 623 pertaining to normal protocol data unit identifications are sent to the charge controller 630.

Further, the "group a connected control unit" 602 process is then shown: a "group" command 614 containing MAC address and control unit (ECU) type is output from the HTML tester 610 to the central gateway 620. The central gateway 620 sends the "group" command to a standard IPv6 address as a default diagnostic request 624 to the charge controller 630. The latter acknowledges the order to group with a default diagnostic response 625 to the central gateway 620. The central gateway 620 in turn uses message 615 to acknowledge to the HTML tester 610 that the grouping process is being performed. The charge controller 630 then performs an IPv6 address configuration 607, then a send and receive configuration for a protocol data unit identification 608, and finally performs a reset 609. At the same time, the central gateway 620 renews a plan 606 stored thereon for the control units. The communication 622 then needs to be reopened to reconfigure the IPv6 address, the charge controller 630 already having been grouped at the time 632 and sending application data 626 and 627 pertaining to normal protocol data unit identifications to the central gateway 620. Reconfiguration of the grouping is possible in the same type of sequence.

Figure 7:
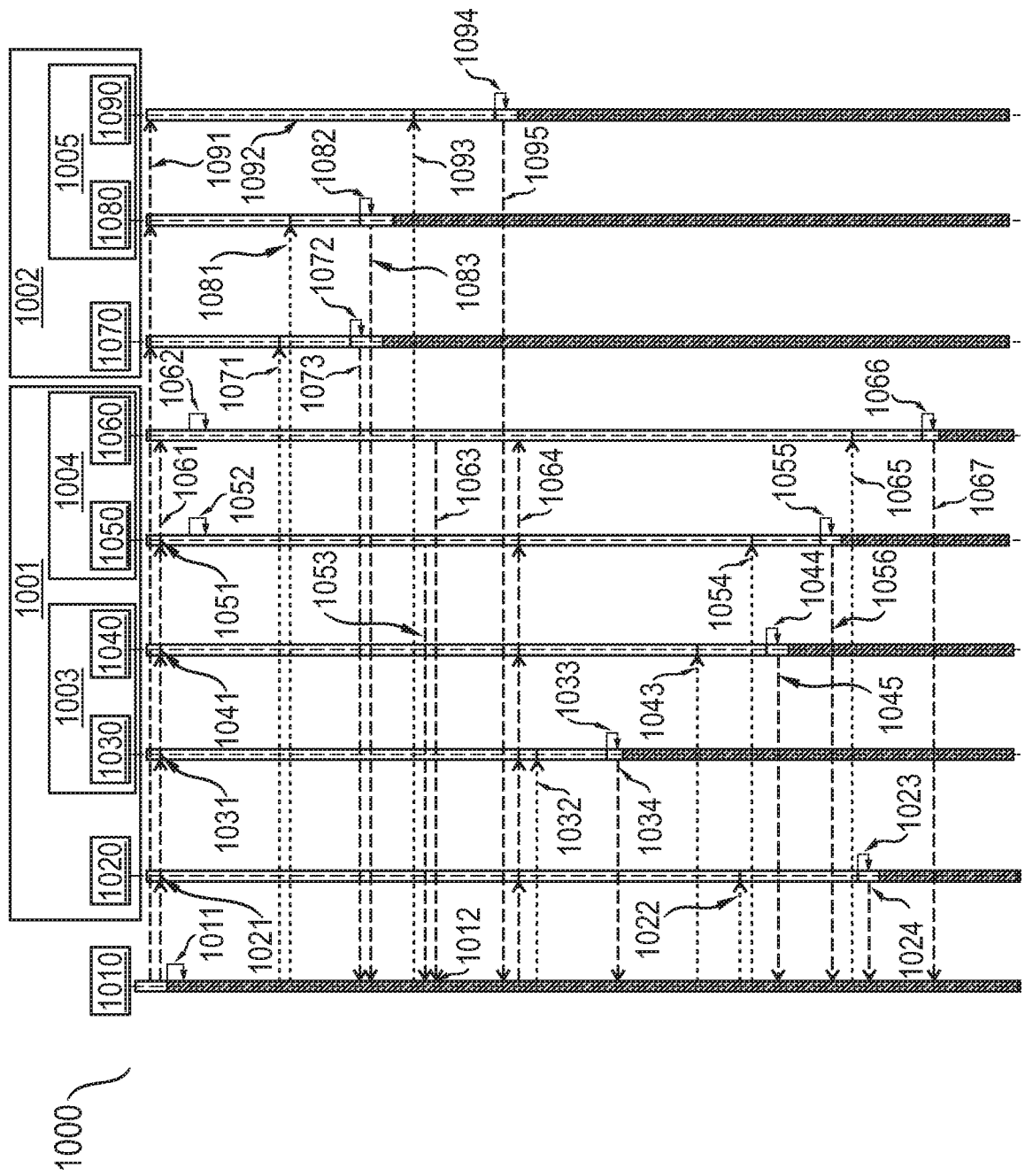
FIG. 7 schematically shows a flow diagram for a reprogramming of control units by means of a flash process according to an embodiment of the method according to the invention.

FIG. 7 schematically shows a flow diagram 1000 for a reprogramming of control units by means of a flash process according to an embodiment of a method according to the invention. To this end, starting from a central gateway 1010, a core network having two cooling groups 1001 and 1002 is arranged in exemplary fashion, wherein the first cooling group 1001 comprises a cooling module KM1 1020, a first charging group 1003 having a charge controller LK1 1030 and a power electronics module LEM1 1040 and a second charging group 1004 having a charge controller LK2 1050 and a power electronics module LEM2 1060, and wherein the second cooling group 1002 comprises a cooling module KM2 1070 and a third charging group 1005 having a charge controller LK3 1080 and a power electronics module LEM3 1090. The timing takes place, as in FIG. 6, along the vertical widened strip from top to bottom, with patterning showing from when the reprogramming is performed for the respective control unit and the latter is available to the charging park again. The scenario described here is supposed to include, in exemplary fashion, an initial situation in which the second charging group 1004 is currently active and is charging an electric vehicle. To begin with, reprogramming is accomplished by virtue of the central gateway 1010 sending every control unit 1020, 1030, 1040, 1050, 1060, 1070, 1080 and 1090 the command 1091 that it is supposed to stop working. The cooling module KM1 1020 changes to the single charging point mode at a time 1021. Said cooling module cannot be flashed, because the second charging group 1004 is still charging the electric vehicle. The charge controller LK1 1030 changes to the single charging point mode at a time 1031. The decision is taken to flash the second cooling group 1002 first, since a charging point (with the reference sign 1004) is already occupied on the first cooling group 1001. The power electronics module LEM1 1040 changes to the single charging point mode at a time 1041. Although said power electronics module could be flashed, it is supposed to remain selectable by a possible user. The charge controller LK2 1050 changes to the single charging point mode at a time 1051 and the power electronics module LEM2 1060 changes to the single charging point mode at a time 1061. Hence, all the control units in the first cooling group 1001 are in the single charging point mode. This is a prerequisite for the central gateway 1010 to be able to be flashed and the control units 1020, 1030, 1040, 1050 and 1060 to nevertheless remain available for a possible user. Next, process 1011 is used to flash the central gateway 1010.

The charge controller LK2 1050 uses process 1052 and the power electronics module LEM2 1060 uses process 1062 to respectively store the command to stop working after termination of a present operation (charging the electric vehicle). The central gateway 1010 uses a diagnostic routine to flash 1071 the second cooling module 1070. Similarly, the diagnostic routine is used to flash 1081 the charge controller LK3 1080. At a time 1072, the flash process on the cooling module KM2 1070 is complete and a reset is performed, completion of the reset being followed by a communication 1073 to the central gateway 1010 that the cooling module KM2 1070 is available, having been switched on again. At a time 1082, the flash process on the charge controller LK3 1080 is complete and a reset is performed, completion of the reset being followed by the communication 1083 to the central gateway 1010 that the charge controller LK3 1080 is available, having been switched on again. The central gateway 1010 then uses the diagnostic routine to provide the power electronics module LEM3 1090 with the communication 1093 that it should now perform flashing. Meanwhile, the charging process on the electric vehicle is complete, this being sent to the central gateway 1010 by the charge controller LK2 1050 with communication 1053 and by the power electronics module LEM2 1060 with communication 1063. At this time 1012, the first cooling group 1001 would then be able to be flashed. This would mean that there were no longer a charging point available, however, since the flash process is still being performed on the power electronics module LEM3 1090, this advantageously being able to be monitored continuously in order to establish when the control unit is free again. Therefore, the flashing of the cooling group 1001 is held until the second cooling group 1002 is available again. At a time 1094, the flash process on the power electronics module LEM3 1090 is complete and a reset is performed, completion of the reset being followed by the communication 1095 to the central gateway 1010 that the power electronics module LEM3 1090 is available, having been switched on again. This is followed by deactivation 1064 of the control units 1020, 1030, 1040, 1050 and 1060 of the first cooling group 1001 from the central gateway 1010. The central gateway 1010 uses the diagnostic routine to provide the charge controller LK1 1030 with the communication 1032 that it should now perform flashing. At a time 1033, the flash process on the charge controller LK1 1030 is complete and a reset is performed, completion of the reset being followed by the communication 1034 to the central gateway 1010 that the charge controller LK1 1030 is available, having been switched on again. Next, the central gateway 1010 uses the diagnostic routine to provide the power electronics module LEM1 1040 with the communication 1043, the cooling module KM1 1020 with the communication 1022 and the charge controller LK2 1050 with the communication 1054 that they should now perform flashing. At a time 1044, the flash process on the power electronics module LEM1 1040 is complete and a reset is performed, completion of the reset being followed by the communication 1045 to the central gateway that the power electronics module LEM1 1040 is available, having been switched on again. At a time 1055, the flash process on the charge controller LK2 1050 is complete and a reset is performed, completion of the reset being followed by the communication 1056 to the central gateway 1010 that the charge controller LK2 1050 is available, having been switched on again. Finally, the central gateway provides the power electronics module LEM2 1060 with the communication 1065 that it should now perform flashing. At a time 1023, the flash process on the cooling module KM1 1020 is complete and a reset is performed, completion of the reset being followed by the communication 1024 to the central gateway 1010 that the cooling module KM1 1020 is available, having been switched on again. Finally, at a time 1066, the flash process on the power electronics module LEM2 1060 is complete and a reset is performed, completion of the reset being followed by the communication 1067 to the central gateway 1010 that the power electronics module LEM2 1060 is available, having been switched on again. This completes the reprogramming of the control units in the core network.

What is claimed is:

1. A network arrangement for a charging park for providing IP services to the charging park, the charging park having a plurality of components, the network arrangement comprises: a core network, a backend server and a central gateway that is coupled to the core network and to the backend server and provides a respective interface for one or more communication nodes of the core network, the components of the charging park being connected communicatively to one another and to the central gateway via the core network, each component of the charging park having an associated communication node of the core network, the components of the charging park interchanging data with the backend server via the central gateway via their respective associated communication nodes and the respective interface associated with the communication nodes, wherein the core network has a tree topology having a root, a plurality of branches, each having at least one communication node, and at least one leaf, wherein the central gateway is the root and the respective components are associated with a respective communication node or leaf, and wherein charge controllers that the plurality of components comprise are each associated with a leaf, and power electronics units that the plurality of components comprise are each associated with a communication node.

2. The network arrangement of claim 1, wherein the central gateway has at least one module of redundant design executing gateway-specific tasks.

3. The network arrangement of claim 1, wherein the core network is an Ethernet-based network in which the communication nodes are connected to the central gateway via respective fiber-optic lines and/or copper lines and/or interfaces and to one another directly and/or to one another indirectly via the central gateway.

4. The network arrangement of claim 1, wherein the charging park comprises at least one central gateway, at least one cooling module, at least one power electronics module, at least one charge control unit and at least one charging cable plug.

5. A network arrangement for a charging park for providing IP services to the charging park, the charging park having at least one central gateway, at least one cooling module, at least one power electronics module, at least one charge control unit, at least one charging cable plug and a plurality of components, the network arrangement comprises: a core network, a backend server and a central gateway that is coupled to the core network and to the backend server and provides a respective interface for one or more communication nodes of the core network, the components of the charging park being connected communicatively to one another and to the central gateway via the core network, each component of the charging park having an associated communication node of the core network, the components of the charging park interchanging data with the backend server via the central gateway via their respective associated communication nodes and the respective interface associated with the communication nodes, wherein the components of the charging park are assigned to respective dedicated housings, the central gateway is implemented in a control server within a transformer station and the control server additionally has a system router, an independent power supply, at least one interface for actuating at least one control unit or sensor that is not involved in the core network and a central switch having a series of Ethernet ports, the at least one cooling module being in a cooling box or a combo box and the cooling box or the combo box having an Ethernet port for each cooling module, the at least one power electronics module being in at least one power box or in the combo box and the power box or the combo box including a switch having a series of Ethernet ports, wherein the at least one charge control unit and the at least one charging cable plug being in at least one distribution unit of at least one distribution group.

6. The network arrangement of claim 1, wherein the IP services provided to the components of the charging park comprise at least one service selected from data transfer, remote computing and database access.

7. The network arrangement of claim 5, wherein the core network has a tree topology having a root, a plurality of branches, each having at least one communication node, and at least one leaf, wherein the central gateway is the root and the respective components are associated with a respective communication node or leaf.

8. The network arrangement of claim 7, wherein charge controllers that the plurality of components comprise are each associated with a leaf, and power electronics units that the plurality of components comprise are each associated with a communication node.

9. The network arrangement of claim 1, configured to perform a data transfer within the core network without or with the involvement of the gateway, but without the involvement of the backend server.

10. A method for addressing components of a charging park to communicate via a core network of a network arrangement that provides IP services to the charging park, the charging park having a plurality of components, the network arrangement comprises: a core network, a backend server and a central gateway that is coupled to the core network and to the backend server and provides a respective interface for one or more communication nodes of the core network, the components of the charging park being connected communicatively to one another and to the central gateway via the core network, each component of the charging park having an associated communication node of the core network, the components of the charging park interchanging data with the backend server via the central gateway via their respective associated communication nodes and the respective interface associated with the communication nodes, wherein every component of the charging park is assigned a unique network address by forming a global identification number, the global identification number being formed from a series of values referring to the charging park, wherein a first value refers to a group of components, a second value refers to a type of the components, a third value refers to a control unit number or a group number, and a fourth value refers to a respective distribution group.

11. The method of claim 10, wherein communication within the core network is executed in line with an Open System Interconnection layer model and monitoring of the communication is made possible by cyclic conveyance of information using end-to-end protection by means of checksum formation.

12. The method of claim 11, wherein monitoring of the communication is extended to a respective electric vehicle intermittently coupled to the charging park.

13. The method of claim 12, wherein at least two components are grouped to form a respective group and the respective group is assigned a unique network address.

14. The method of claim 10, wherein a flash process performs reprogramming of at least one component of the charging park.

* * * * *